United States Patent [19]

Rudick

[11] Patent Number: 5,605,765
[45] Date of Patent: Feb. 25, 1997

[54] DECORATIVE COMPOSITE ARTICLE AND METHOD OF MAKING A DECORATIVE PATTERN

[75] Inventor: Dan Rudick, Petach Tikva, Israel

[73] Assignee: Magma Industries (ILUM) Ltd., Petach Tikva, Israel

[21] Appl. No.: 354,103

[22] Filed: Dec. 6, 1994

[51] Int. Cl.$^6$ ..................................................... B32B 9/00
[52] U.S. Cl. .................. 428/484; 428/7; 428/15; 428/22; 428/488.1; 431/288; 431/289; 427/371; 427/363; 264/83; 264/173.11
[58] Field of Search ................... 428/7, 15, 484, 428/485, 488.1, 22; 431/288, 291, 289, 126, 125; 264/171, 245, 114, 115, 123, 83, 250

[56] References Cited

U.S. PATENT DOCUMENTS

| | | |
|---|---|---|
| 1,307,886 | 6/1919 | Schulz . |
| 1,477,094 | 12/1923 | Wilson . |
| 1,994,164 | 3/1935 | Bailey ........................................ 18/59 |
| 2,174,779 | 10/1939 | Delorme ..................................... 18/13 |
| 3,741,711 | 6/1973 | Bryant ..................................... 431/125 |
| 3,894,136 | 7/1975 | Waddill . |
| 3,923,438 | 12/1975 | Perla . |
| 3,983,677 | 10/1976 | Lundbom ..................................... 53/3 |
| 4,077,110 | 3/1978 | Reiher ....................................... 29/458 |
| 4,092,388 | 5/1978 | Lewis . |
| 4,094,946 | 6/1978 | Finkensiep ............................. 264/171 |
| 4,110,261 | 8/1978 | Newland ................................. 252/522 |
| 4,225,552 | 9/1980 | Chang ..................................... 264/247 |
| 4,304,745 | 12/1981 | Alderson et al. . |
| 4,568,270 | 2/1986 | Marcus et al. .......................... 431/288 |
| 4,845,635 | 7/1989 | Ravelli ............................... 364/474.01 |
| 5,395,233 | 3/1995 | Karp ........................................ 431/289 |

FOREIGN PATENT DOCUMENTS

| | | |
|---|---|---|
| 0254656A | 1/1988 | European Pat. Off. . |
| 2051312 | 4/1972 | Germany . |
| 57-70200 | 4/1982 | Japan . |
| 58-84732 | 5/1983 | Japan . |
| 60-15116 | 1/1985 | Japan . |
| 707014 | 4/1954 | United Kingdom . |

*Primary Examiner*—Patrick Ryan
*Assistant Examiner*—Abraham Bahta
*Attorney, Agent, or Firm*—Lowe, Price, LeBlanc & Becker

[57] ABSTRACT

A decorative composite is formed by extruding a plurality of colored rods to form an elongated decorative composite article having a decorative pattern throughout defined by the individual rods. The decorative composite can be formed into decorative consumable articles, such as soap bars, deodorants, air fresheners or candy. A decorative veneer can be formed by slicing thin sections in a direction generally perpendicular to the longitudinal axis of the decorative composite article. A decorative wax veneer can be formed by employing colored wax rods. The decorative wax veneer is applied to a core to form a decorative article, such as a clear wax core to form a glowing candle. Enhanced resolution of the decorative pattern is achieved by generating an enlarged digitized image of the decorative pattern comprising a plurality of colored pixels and selecting individually colored rods in accordance with the observed colored pixels of the enlarged digitized image.

111 Claims, 8 Drawing Sheets

DECORATIVE COMPOSITE ARTICLE AND METHOD OF MAKING A DECORATIVE PATTERN

TECHNICAL FIELD

The invention relates to a decorative composite article and method for producing such, decorative veneer, an article comprising the decorative veneer, and to a method for producing the decorative veneer and composite article. The invention has particular applicability to a decorative wax veneer for a candle and to consumable decorative articles, such as soap bars, deodorants and confections.

BACKGROUND ART

There are various types of decorative articles and articles manufactured with a decorative veneer, such as bottles, bowls, decanters, lamp shades, vases, including various consumable articles having a decorative pattern, such as candles, soap, confections, deodorants, and air fresheners. Lundbom (U.S. Pat. No. 3,983,677) discloses a decorative candle comprising an inner wax core and an outer wall made of a wax having a higher melting point than the wax core, with stones embedded in the outer wax wall for decorative purposes. Chang (U.S. Pat. No. 4,225,552) discloses a decorative candle comprising a lower melting wax core and an outer shell having wax flowers embedded therein. Bryant (U.S. Pat. No. 3,741,711) discloses a composite reusable decorative candle in the form of a clear, unpigmented core and a decorative surface. A glass cup is provided to prevent transfer of sufficient heat to the main body of the candle and decorative surface ornamentation. A new candle may be placed within the glass cup. Upon burning, light is transmitted from the candle to produce a glowing or luminescent effect. German Patent No. 2 051 312 discloses a method of producing wax candles employing an extruder wherein an external colored pattern is worked into the outer layer of the molded body. Rosselli (U.S. Pat. No. 4,845,635) discloses a method for automatically stamping designs onto candles under computer control.

Decorative disks or slabs have previously been produced by combining a plurality of elongated rods into a composite article and cutting decorative disks or slabs from the composite article. The decorative disks can be employed for floor coverings, wall coverings and mosaics as disclosed in Schülz (U.S. Pat. No. 1,307,886), buttons as disclosed in Bailey (U.S. Pat. No. 1,994,164), Wilson (U.S. Pat. No. 1,477,094) and Nakamura (Japanese Patent No. 58-84732), or other plastic decorative articles disclosed as in U.K. Patent No. 707,014. The use of an extruder for forming varied colored plastics is disclosed by Wilson (U.S. Pat. No. 1,477,094) and Delorme, (U.S. Pat. No. 2,174,779). Japanese Patent No. 60-15116 discloses the direct extrusion of a pigmented plastic after melting and kneading. The solidification of wax into an arbitrary pattern or design by pouring melted wax onto the surface of cool water with subsequent rolling to form a lamp shade is disclosed by Waddill (U.S. Pat. No. 3,894,136).

An innovation in decorative candles, commonly referred to as the "glowing candle" is manufactured and sold by Magma Industries (ILUM) Ltd., Petach Tikva, Israel and The Glowing Candle Factory, Inc., San Diego, Calif. The typical glowing candle comprises a decorative wax veneer and a clear wax core containing a wick. Light generated by the burning wick passes through the clear wax core and then through the decorative pattern of the veneer. The glowing candle derives its name from the luminescent or glowing visual impact generated by the illumination cast by the burning wick through the decorative veneer. Illumination enhances the decorative pattern with an aura of brilliance thereby rendering the glowing decorative pattern visually distinct from the unilluminated or non-glowing decorative pattern.

It has been known to produce various types of consumable articles, such as soap, with a decorative pattern throughout. See, for example, Lewis (U.S. Pat. No. 4,092,388) wherein a method for manufacturing variegated soap bars is disclosed, which method comprises feeding noodles into a plodder through an opening communicating essentially only with a portion of the worm of the plodder. The resulting bars are cut and then stamped. There are also various methods of making multicolored detergent bars, such as soap bars, by extrusion. See, for example, Alderson et al. (U.S. Pat. No. 4,304,745), Finkensiep et al., (U.S. Pat. No. 4,094,946), Perla (U.S. Pat. No. 3,923,438), European Patent No. 0254-656-A and Japanese Patent No. 57-70200.

One of the drawbacks of conventional decorative articles, including consumable soap bars and decorative articles having a decorative veneer, particularly a decorative wax veneer, such as the glowing candle, is the inability to produce the decorative pattern with high resolution, so that fine details of the decorative pattern are visible to the human eye. Conventional techniques are also incapable of producing a decorative pattern from a plurality of extruded, colored, rods with an intricate design having fine details. In addition, it is also difficult if not impossible to accurately determine, in advance, the location of a particular portion or area of a decorative pattern with respect to the perimeter or frame of the complete decorative pattern. These problems and shortcomings stem, in part, from the inherent limitations of the conventional manner in which decorative patterns, particularly decorative wax patterns, are produced and the inherent distortion encountered when processing at softening temperatures.

The conventional glowing candle is made by a rather long and unrefined process. Initially, a wax, such as a fully refined paraffin wax, is blended with a colored pigment and, optionally, a dispersant, at a temperature of approximately 80° C. at a high rpm, such as 20,000 rpm. The molten blended wax is then poured onto the surface of cool water whereby solidified plates of wax are formed which float on the surface of the water. The resulting plates are typically about 10–60 centimeters in width, about 40–120 centimeters in length, and about 0.5–3 centimeters in thickness. The wax plates, each having a distinct color, are then heat treated in an oven maintained at a temperature of about 40° to 45° C. by circulating hot air for about 4 to 8 hours in order to render them flexible. A plurality of heated flexible wax sheets are then stacked upon one another and rolled, the color and number of wax sheets depending upon a desired decorative pattern. For example, in preparing a veneer similar to that employed to manufacture the glowing candle depicted in FIG. 1 having a simple flower pattern, a plurality of sheets are selected so that when rolled a generally cylindrical rod is obtained, as shown in FIG. 2, having an inner core 20 of a particular color, such as red, an intermediate layer 21 of, for example, yellow, and an outer annular portion 22 of, for example, white. The diameter of the rolled cylindrical wax rod is about 20 centimeters.

The rolled cylindrical wax rod is then extruded, as in a conventional-type extruder, by forcing it through a heated chamber having a circular dye head or orifice with a piston. The resulting first extruded wax rod is immediately dropped into water to be cooled. The first extruded wax rod has essentially the same cross-sectional shape as the unextruded composite wax rod with a considerably narrower diameter, e.g. about as 7 centimeters, and a greater length, e.g. about 160 centimeters. A typical cross-section of the first extruded wax rod, therefore, is similar to that depicted in FIG. 2 and serves as the center portion of a flower pattern.

Composite structures which ultimately serve as flower petals to be positioned about the center of the flower are then produced. For example, a plurality of heated flexible wax sheets having appropriately selected colors are stacked and formed into a U-shaped configuration as shown in FIG. 3, wherein sheets 31 through 33 may be similar or different in color depending upon the selected colors of the flower pattern. A plurality of such composite U-shaped wax sheets are then extruded to form second extruded composite rods which are immediately cooled in water to avoid memory shrinkage.

A first extruded wax rod and a plurality of second extruded wax rods are then assembled in a manner to resemble a flower pattern, as shown in FIG. 4. The center portion 41 corresponds to the first extruded wax rod formed by extruding the composite shown in FIG. 2, while the petals 42 correspond to the second extruded wax rods formed by extruding the U-shaped composite shown in FIG. 3. An outer wrapping 43 comprising a wax sheet is wound about the assembled extruded wax rods to prevent movement. The assembly is heated in an oven and extruded through a circular orifice to form a third composite extruded wax rod containing a decorative pattern resembling a single flower throughout its entire length. A plurality of such third composite extruded wax rods depicting a single flower, each having a diameter of about 3 centimeters, are then arranged in a circular pattern and extruded to form a fourth extruded composite wax rod having a diameter of about 3.75 to 4 centimeters. Extrusion is carried out in a conventional extruder, such as that shown in FIG. 5A. A plurality of decorative veneer sections are then sliced from an end of the fourth composite wax rod, each having a thickness of about 0.25 centimeters.

In manufacturing a glowing candle such as that shown in FIG. 1, a clear wax core having a desired shape, such as circular, cylindrical or hexagonal, is formed. The wax core and a plurality of decorative veneer sections are heated with hot air to effect softening. The decorative wax veneer sections are then applied to the outer surface of the clear wax core. The resulting composite is placed in a mold and subjected to pressure for complete bonding and shaping. Subsequently, an axial hole is drilled in the clear wax core and a wick provided. The candle is then subjected to finishing operations, such as polishing and dipping in a molten bath of a clear wax.

Normally, the wax employed for both the decorative veneer and core is a fully refined paraffin wax. However, the melting or softening point of the wax employed for the core of a glowing candle is normally lower than the melting or softening point of the wax employed for the decorative veneer so that, upon consumption of the wick, the decorative wax veneer remains intact and can be reused or employed as a decorative ornament.

The disadvantages of the above-discussed conventional glowing candle and method of manufacturing thereof are several. One of the most troublesome drawbacks of articles having a decorative pattern defined by a plurality of colored rods, particularly the conventional glowing candle, is the inability to achieve high resolution decorative patterns, or accurate reproducibility. Not only is it difficult to achieve decorative patterns which exhibit high resolution, the conventional practice is limited in its inability to produce intricate decorative pattern having fine details. Another drawback of conventional practices is the inability to preplan the proximity of a particular area of a decorative pattern with respect to the perimeter of the decorative pattern or frame. In conventional practices, the decorative pattern was subject to shifting during extrusion and could not be controlled.

There are several factors which contribute to the poor resolution and poor reproducibility of conventional decorative wax veneers. A significant factor is that the selection of different colored rods is made in response to observing the entire decorative pattern and, therefore, subject to the inherent limitations of the human eye, which confine the decorative patterns to relatively simple, nonintricate designs. In addition, after extensive investigations, I found that the use of a conventional circular dye head rendered it extremely difficult to control the accuracy of the decorative pattern. I discovered that when employing a circular dye head, the heated rods underwent swirling when squeezed together thereby generating a corkscrew-like effect distorting the decorative pattern as the composite comprising a plurality of rods exited the extrusion dye head.

Another disturbing drawback of conventional manufacturing techniques is that the visual impact of the final decorative pattern of the candle, when glowing, could not be accurately predicted, because the glowing visual impact is quite different from the non-glowing visual impact of the decorative pattern. Since it was not possible to determine the appearance of the glowing decorative pattern prior to manufacturing the final product, conventional manufacturing practices offered no opportunity to modify, adjust or fine tune the decorative pattern during manufacturing to provide a desired, predictable glowing visual impact. Conventional practices also required time consuming manipulative steps, solidifying wax sheets, rolling the wax sheets, and wrapping wax rods.

DISCLOSURE OF THE INVENTION

An object of the present invention is a wax veneer having a high resolution decorative pattern throughout.

A further object of the present invention is a method of producing a wax veneer comprising a high resolution decorative pattern which can be tailor-made with a high degree of accuracy.

Yet another object of the invention is an efficient method of producing a wax veneer comprising a high resolution decorative pattern from individually colored wax rods with a minimum number of processing steps.

Another object of the invention is a method of producing a wax veneer having a high resolution decorative pattern which can be adjusted during manufacturing to obtain a desired visual effect when illuminated.

Still another object of the present invention is a decorative article having a decorative pattern throughout, which decorative pattern exhibits high resolution, intricate details, can be controlled so that any selected area of the decorative pattern can be provided in preplanned proximity to the perimeter or frame of the decorative pattern.

A further object of the invention is a consumable article having a high resolution decorative pattern throughout.

Another object of the present invention is a method of producing a consumable article having a high resolution decorative pattern throughout.

Additional objects, advantages and other features of the invention will be set forth in part of the description which follows and in part will be, apparent to those having ordinary skill in the art upon examination of the following or may be learned from practice of the invention. The objects and advantages of the invention may be realized and attained as particularly pointed out in the appended claims.

According to the present invention, the foregoing and other objects are achieved in part by an elongated composite wax article having a longitudinal axis, a front face and a rear face, which composite wax article comprises a plurality of distinctly colored elongated wax rods extending in a direction generally parallel to the longitudinal axis and defining a decorative pattern throughout the elongated composite wax article, including on the front and rear faces and at any cross-section taken in a direction generally perpendicular to the longitudinal axis, and wherein the elongated composite wax article comprises greater than about 30 wax rods per square centimeter of cross-sectional area.

Another aspect of the invention is an elongated composite wax article having a longitudinal axis, a front face and a rear face, which composite wax article comprises a plurality of elongated composite wax sections having a generally square cross-sectional shape, each square composite wax section containing a plurality of distinctly colored elongated wax rods extending in a direction generally parallel to the longitudinal axis and defining a decorative pattern throughout the elongated composite wax article including on the front and rear faces and at any cross-section taken in a direction generally perpendicular to longitudinal axis.

A further aspect of the invention is a decorative wax veneer comprising a front face and a rear face formed by a plurality of distinctly colored wax rods defining a decorative pattern throughout the veneer including on the front and rear faces and at any cross-section taken in a direction generally perpendicular to an axis between the front and rear faces, and wherein the decorative veneer comprises greater than about 30 wax rods per square centimeter of cross-sectional area.

A still further aspect of the invention is a candle comprising a clear wax core and a decorative wax veneer having a front face and a rear face formed by a plurality of clear wax rods defining a decorative pattern throughout the veneer including on the front and rear faces and at any cross-section taken in a direction generally perpendicular to an axis between the front and rear faces, and wherein the decorative veneer comprises greater than about 30 wax rods per square centimeter of cross-sectional area.

A further aspect of the invention is a method of making a decorative wax veneer comprising: selecting a plurality of distinctly colored wax rods; extruding the selected wax rods to form an elongated extruded composite wax article having a longitudinal axis, a front face and a rear face, wherein the wax rods define a decorative pattern throughout the extruded composite wax article including on the front and rear faces and at any cross-section taken in a direction generally perpendicular to the longitudinal axis, wherein the extruded composite wax article comprises greater than about 30 wax rods per square centimeter of cross-sectional area; and cutting a thin section off the extruded composite wax article in a direction generally perpendicular to the longitudinal axis to form the decorative veneer.

Yet another aspect of the present invention is a method of making a decorative wax veneer containing a decorative pattern comprising: selecting a decorative pattern; generating a digitalized image of the selected decorative pattern, which digitized image comprises a plurality of distinctly colored pixels; selecting a plurality of distinctly colored wax rods in accordance with the colored pixels of the digitalized image; extruding the wax rods to form an elongated extruded composite wax article having a longitudinal axis, a front face and a rear face, wherein the wax rods define a decorative pattern throughout the composite wax article including on the front and rear faces and at any cross-section taken in a direction generally perpendicular to the longitudinal axis; and cutting a thin section off the extruded composite wax article in a direction generally perpendicular to the longitudinal axis to form the decorative veneer.

A further object of the present invention is a method of making a decorative wax veneer containing a decorative pattern thereon comprising: selecting a decorative pattern; generating a digitalized image of the selected decorative pattern, which digitized image comprises a plurality of sections each comprising a plurality of distinctly colored pixels; selecting a plurality of distinctly colored wax rods in accordance with the colored pixels of the sections of the digitalized image; extruding the wax rods to obtain a plurality of elongated extruded composite wax sections each having a generally square cross-sectional shape; selecting a plurality of extruded composite wax sections in accordance with the sections of the digitalized image; extruding the extruded composite wax sections to form an elongated extruded composite wax article having a longitudinal axis, a front and rear face and a generally square cross-sectional shape, wherein, the wax rods define a decorative pattern throughout the extruded composite wax article including on the front and rear faces and at any cross-section taken in a direction generally perpendicular to the longitudinal axis; and cutting a thin section off the extruded composite wax article in a direction generally perpendicular to the longitudinal axis to form the decorative veneer.

Still another aspect of the invention comprises an elongated consumable article having a longitudinal axis, a front face and a rear face, which consumable composite article comprises a plurality of distinctly colored elongated consumable rods extending in a direction generally parallel to the longitudinal axis and defining a decorative pattern throughout the elongated composite article, including on the front and rear faces and at any cross-section taken in a direction generally perpendicular to the longitudinal axis, and wherein the elongated consumable composite article comprises a greater than 30 consumable rods per square centimeter of cross-sectional area.

Still another object of the present invention is a method of making a consumable article having a decorative pattern throughout, which method comprises selecting a plurality of distinctly colored rods of a consumable material, extruding the selected rods to form an elongated extruded composite article having a longitudinal axis, a front face and a rear face, wherein the rods define a decorative pattern throughout the extruded composite article including on the front and rear faces and at any cross-section taken in a direction generally perpendicular to the longitudinal axis, wherein the extruded composite article comprises greater than about 30 rods per square centimeter of cross-sectional area, and cutting a section off the extruded composite article in a direction generally perpendicular to the longitudinal axis to form the consumable decorative article.

A further object of the present invention is a method of making a consumable article having a decorative pattern throughout, which method comprises: selecting a decorative pattern; generating a digitized image of the decorative pattern comprising a plurality of colored pixels; selecting a plurality of colored rods of a consumable material in accordance with the colored pixels; extruding the plurality of selected rods to form an elongated composite article having a longitudinal axis, wherein the plurality of rods define a decorative pattern throughout the elongated composite article; and cutting a section in a direction generally perpendicular to the longitudinal axis to form the consumable decorative article.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
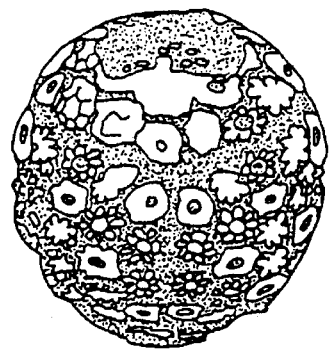
FIG. 1 depicts a conventional glowing candle.
Figure 2:
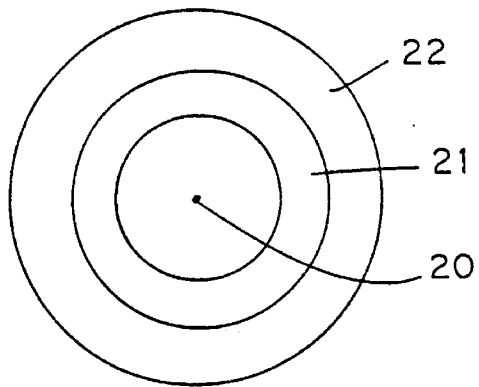
FIG. 2 is a cross-sectional view of extruded wax sheets according to a conventional technique.
Figure 3:
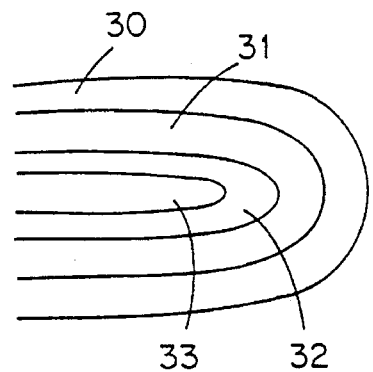
FIG. 3 is a cross-sectional view of extruded wax sheets according to a conventional technique.
Figure 4:
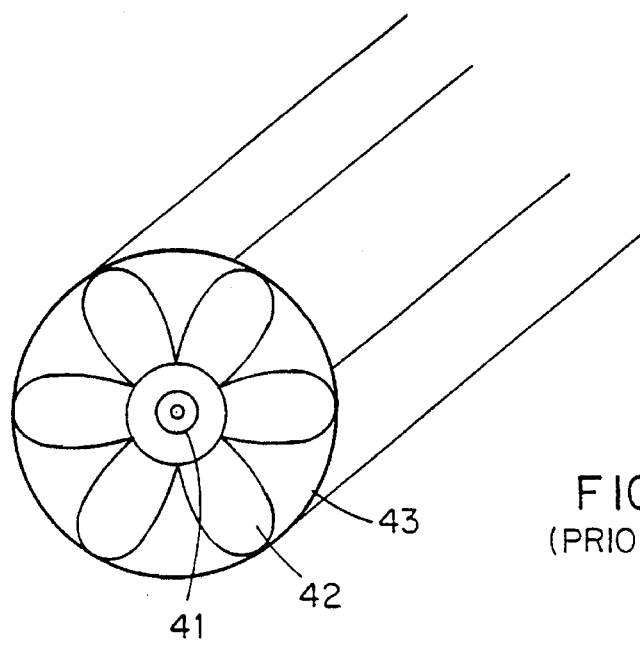
FIG. 4 depicts a composite wax rod formed by a conventional technique.

The present invention is directed to a decorative article having a high resolution decorative pattern thereon and throughout. One aspect of the present invention is a decorative wax veneer. The present invention enables the production of decorative articles, particularly decorative wax veneers, having various intricate designs with accurate predictability and reproducibility. In addition, the present invention provides the capability of modifying or adjusting the decorative pattern during the manufacturing process to achieve a desired predictable decorative pattern and, in the case of a decorative wax veneer, to achieve a desired, predictable luminescent or glowing visual impact of the decorative pattern. These advantages cannot be attained with conventional methods, primarily because the colored rods are selected in response to observing a desired decorative pattern with the human eye. The maximum number of rods capable of being selected to form conventional decorative patterns was, therefore, subject to the inherent limitations of the human eye.

An aspect of the present invention which addresses and overcomes the inherent limitations of the human eye and, therefore, overcomes the previously mentioned problems and drawbacks of conventional practices resides in the use of a computer generated digitized image which is sectioned and each section enlarged to provide a plurality of working maps containing colored pixels which are visible to the human eye. A distinctly colored rod is selected in accordance with each colored visible pixel, without viewing a significant portion of the ultimate decorative pattern, to accurately produce the decorative pattern, as in a wax veneer, including intricate designs with fine details, with a high degree of resolution. Thus, in the present invention, colored rods are selected in accordance with the visible colored pixels in a plurality of enlarged sections of a computer generated digitized image, each section comprising a small part of the ultimate decorative pattern.

The initial phase of a preferred embodiment of the present invention resides in providing a desired decorative pattern, including intricate designs not heretofore attainable in a wax veneer. A computer with conventional software is employed to generate a digitized image of the desired decorative pattern in color. Conveniently, an intricate decorative pattern is scanned to generate the digitized image of the decorative pattern to form a working plan of the ultimate decorative pattern to enable the actual decorative pattern to be reproduced with precision.

The digitized image is divided into a plurality of sections each of which is enlarged to present a plurality of colored pixels visible to the human eye. The selection of colored wax rods for extrusion is made in accordance with the observed colored pixels in a particular enlarged section. Appropriate software to obtain a suitable digitized image is commercially available and includes, for example, CorelDraw and PhotoShop.

Figure 6A:
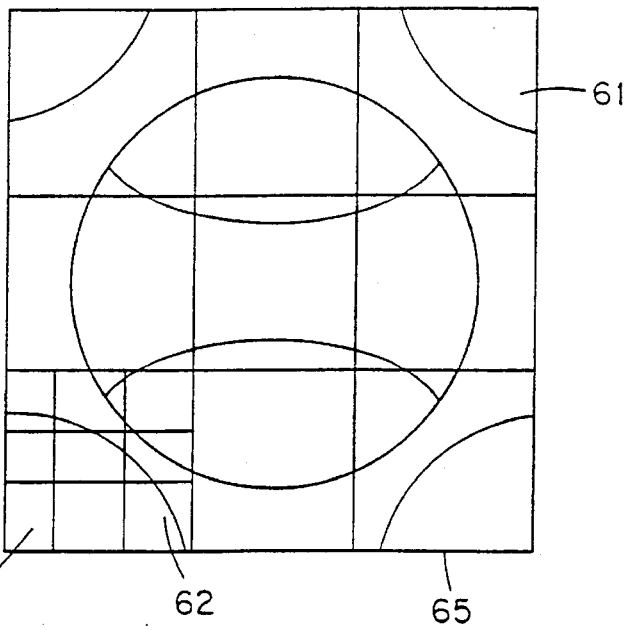
FIG. 6A schematically illustrates the enlargement of a digitized image in accordance with the invention.

Preferably, the digitized image is divided into a plurality of squares, for example, nine squares 61 as shown in FIG. 6A. Each square 61 is then enlarged and further divided into nine subsquares 62. Each subsquare 62 is further enlarged to form enlarged subsquare 63 which contains a plurality of colored pixels 64 visible to the human eye. In a preferred embodiment, each enlarged subsquare 63 contains about 50 visible colored pixels 64 having a generally right triangular shape.

In producing the inventive decorative wax veneer, each of the enlarged computer generated digitized subsquares 63 containing a plurality of visible colored pixels 64 is observed with the human eye and an appropriately colored wax rod is selected in accordance with each visible colored pixel 64, i.e., a wax rod is selected having a color corresponding to the color of each visible pixel.

Figure 5A:
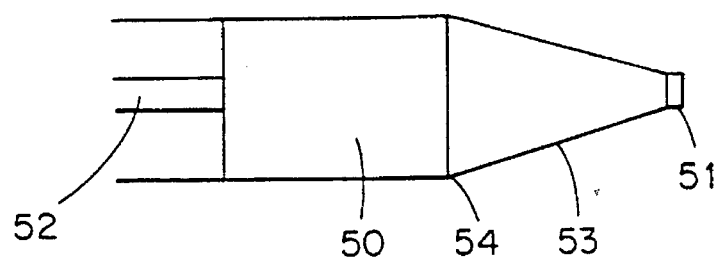
FIG. 5A shows a partial side view of an extrusion apparatus employed in the present invention.
Figure 5B:
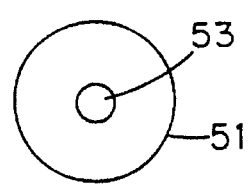
FIGS. 5B, 5C and 5D show different shaped dye heads for the extrusion apparatus of FIG. 5A.
Figure 5C:
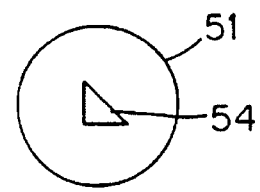
Figure 5D:
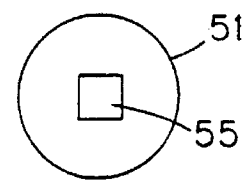

The wax rods can be formed in a conventional manner, as by blending a wax, pigment and dispersant. The molten blend is cast into a bath of cool water to obtain wax sheets. One or more wax sheets are stacked, rolled into cylindrical shape, extruded in an extrusion apparatus, such as that shown in FIG. 5 to obtain various shaped rods dependent upon the shape of the dye head on the extruder. The extruder typically comprises a piston 52, chamber 50, extrusion head or nozzle 53 and extrusion dye head or orifice 51. As shown in FIGS. 5B, 5C and 5D, the orifice can be circular, triangular or square, respectively. Typically, the extruder is opened for loading at circumferential joint 54.

Although any conventional wax can be employed, is preferred to employ a fully refined paraffin wax having a minimum amount of oil. Such waxes are commercially available, as from various oil refiners. The pigment employed in the present invention can be any conventional pigment, including organic and inorganic pigments. Preferably, an organic pigment is used, most preferably a natural organic pigment.

A dispersant is preferably incorporated to effect uniform dispersement of the pigment throughout the wax thereby obtaining a desirably homogeneous wax rod. Any conventional dispersant may be employed, such as Antaron V-216.

The wax, pigment and dispersant are thoroughly blended at a relatively high rate of about 20,000 rpm to about 40,000 rpm in a conventional blender, preferably at 30,000 rpm, at a suitable temperature, normally between 70° and 95° C., preferably 80° to 90° C. The hot molten blend is poured into a basin containing water to form wax plates which are left to cool. The wax plates are then heated in an oven at a temperature of about 40° to about 50° C., preferably about 46° C. While hot, a selected number of wax plates, e.g., from one to six, are stacked, rolled, wrapped and then extruded to produce a plurality of distinctly colored wax rods.

In a preferred aspect of this embodiment of the present invention, the steps of forming wax plates, stacking the wax plates and rolling them are omitted. Instead, immediately after blending, the molten wax blend is directly extruded in a conventional-type extruder to form a plurality of distinctly colored wax rods which are immediately cooled upon extrusion to avoid distortion.

The wax rods are preferably extruded through an orifice in the form of a right triangle such as that shown in FIG. 5C to obtain extruded wax rods with a generally right triangular cross-sectional shape. It has been found that the use of wax rods having a generally right triangular cross-sectional shape facilitates the formation of accurate contours in an intricate decorative pattern thereby enhancing resolution.

Throughout this disclosure, the expressions "distinct color" or "distinctly colored" denote a particular color characteristic, comprehensive of a single uniform color as well as a multicolor pattern. For example, in some intricate decorative patterns, such as a decorative pattern comprising snowflakes against a blue sky, a rod is pigmented to reveal at least a portion of a white snowflake against a blue background.

Figure 6B:
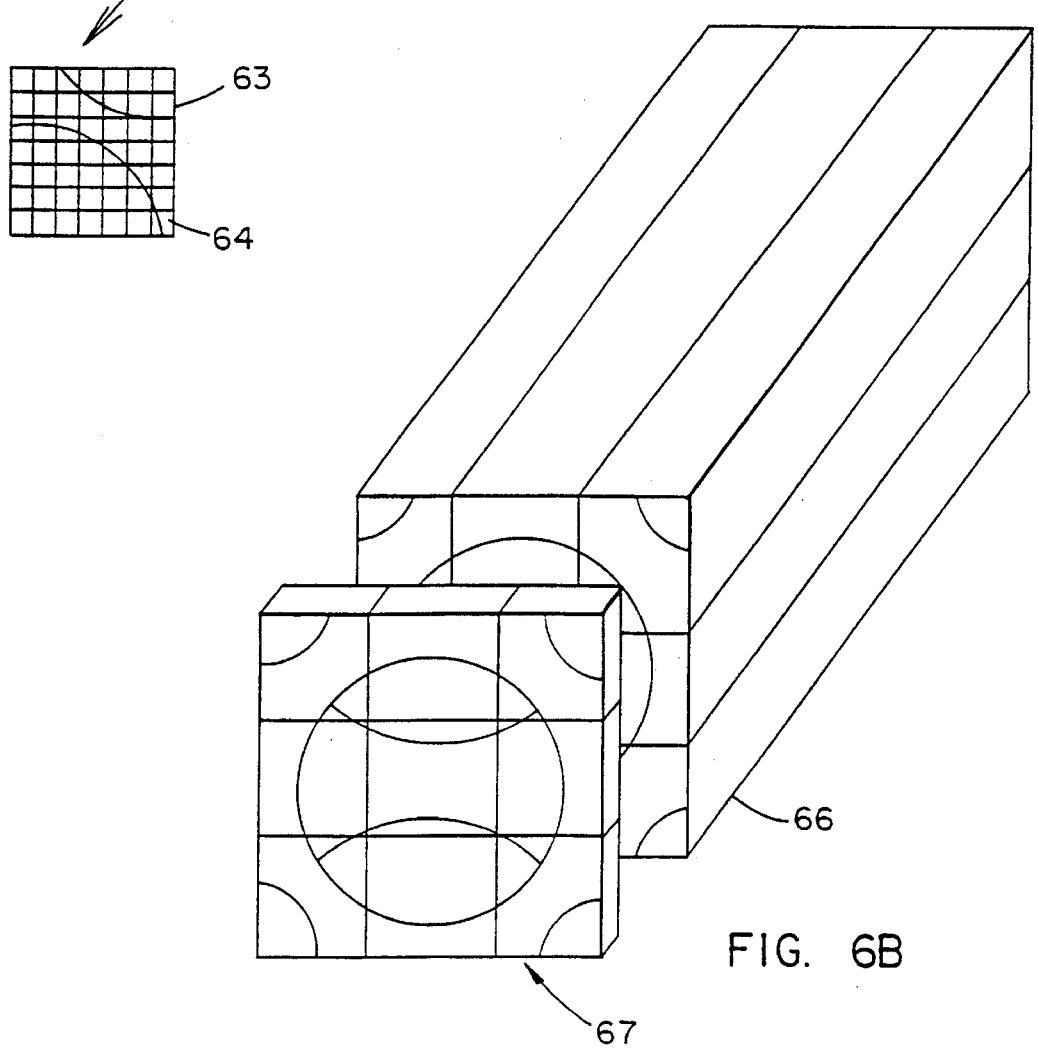
FIG. 6B illustrates a decorative wax veneer section of the invention cut from an extruded composite wax article.
Figure 7:
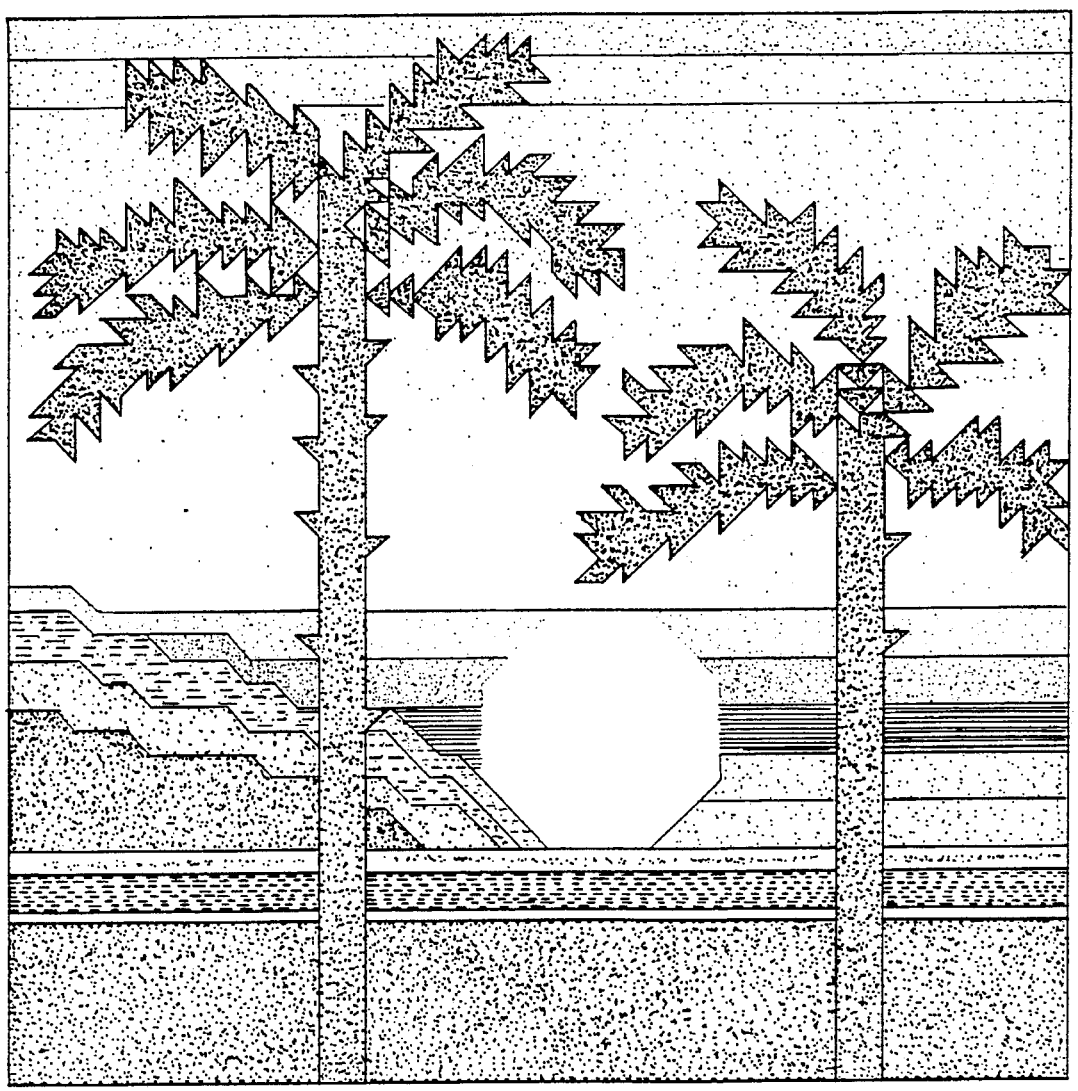
FIG. 7 depicts a computer generated digitized image of a decorative pattern employed in the invention.
Figure 8A:
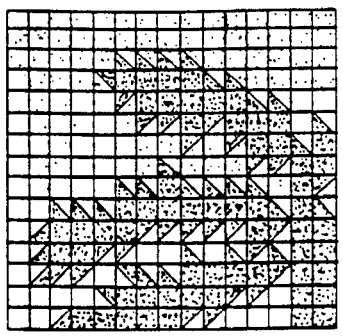
FIG. 8 shows the digitalized image of FIG. 7 divided into nine square sections.
Figure 8B:
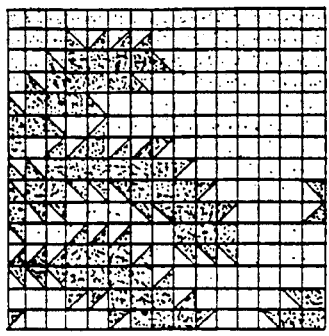
Figure 8C:
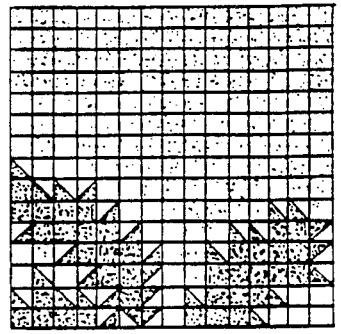
Figure 8D:
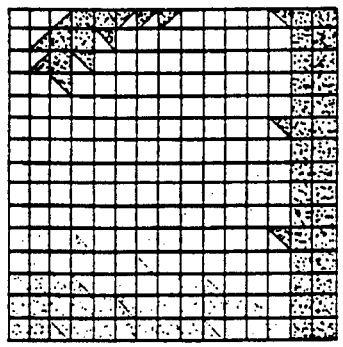
Figure 8E:
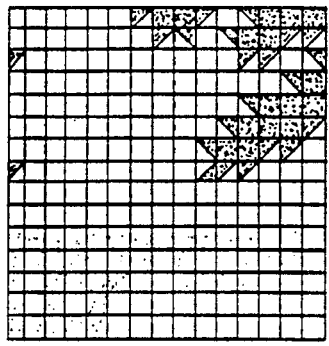
Figure 8F:
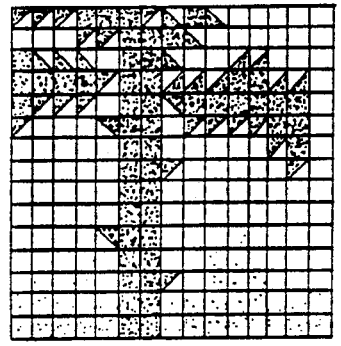
Figure 8G:
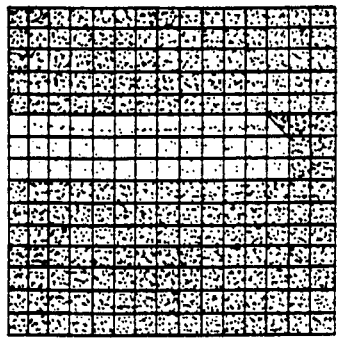
Figure 8H:
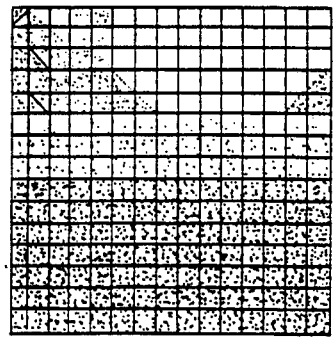
Figure 8I:
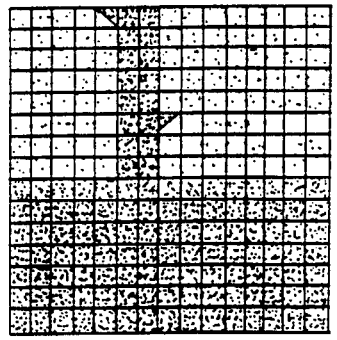

With reference to FIG. 6A, a plurality of wax rods, each having a color corresponding to the color of a visible pixel 64, are selected, assembled and extruded to form a first extruded composite elongated wax section comprising a plurality of individual wax rods. In a preferred embodiment, the extrusion dye orifice is a square or right triangle, such as that shown in FIG. 5D or FIG. 5C. The first extruded composite wax section with a preferably generally square or generally right triangular cross-sectional shape corresponding to subsection 62. A plurality of first extruded composite wax sections corresponding to subsections 62 are then similarly formed by selecting appropriately colored wax rods according to visible colored pixels 64 within each enlarged subsection 63. A plurality of first extruded composite sections are then selected, assembled and extruded to form a second extruded composite wax section corresponding to a section 61, preferably in general form of a square. The selection and extrusion steps are repeated until a plurality of second extruded composite wax sections are obtained, each corresponding to a square 61 in FIG. 6A. The second extruded composite wax sections are then extruded to form an extruded elongated composite wax article 66, shown in FIG. 6B, having the decorative pattern shown on square 65 formed by the wax rods extending generally parallel to the longitudinal axis of the extruded composite article. The decorative pattern is formed throughout the extruded composite wax article including on its front and rear faces and at any cross-section taken in a direction generally perpendicular to its longitudinal axis. The decorative veneer of the present invention 67 is then formed by cutting sections, preferably in thickness of about 0.15 to about 0.4 centimeters, from an end of the extruded composite wax article in a direction generally perpendicular to its longitudinal axis. Preferably, the extruded composite wax article and veneer has a cross-sectional area of about 15 to about 150 square centimeters.

The inventive method is not limited to dividing the digitized image into any particular number of sections or subsections. Indeed, it should be readily apparent that the degree of resolution increases as the number of sections and subsections increase. Thus, the subsections can also be divided a number of times. Moreover, the present invention is not confined to the enhanced resolution and/or enlargement of the entire decorative pattern. For example, a particular portion of a decorative pattern can be isolated and enlarged a number of times in order to obtain that particular portion of the decorative pattern having a high resolution thereby enabling the presentation of an intricate pattern having finer detail in a particular portion of the overall decorative pattern.

Conventional practices generally result in a veneer having a decorative pattern containing about 200 to about 220 wax rods, or less than about 30 wax rods per square centimeter of cross-sectional area. However, by employing the computer generated digitized image technique of the present invention, a decorative article, including a decorative veneer, containing about 250 to about 30,000 wax rods, or about 30 to about 1,200 rods per square centimeter of cross-sectional area is obtained. Thus, the decorative articles and decorative veneer of the present invention exhibit a degree of resolution significantly greater than that exhibited by conventional decorative veneers and the decorative patterns can comprise intricate designs and details heretofore unattainable.

By employing the present invention, an extruded composite, article, preferably a wax article, is obtained having a longitudinal axis, a front face and a rear face, which extruded composite wax article comprises a plurality of distinctly colored wax rods, defining a decorative pattern throughout the extruded composite wax article including on the front and rear faces and at any cross-section taken in a direction generally perpendicular to the longitudinal axis. The extruded composite wax article normally comprises in excess of thirty wax rods per square centimeter of cross-sectional area, preferably 100 to about 1,200 rods per square centimeter of cross-sectional area. The extruded composite wax article can have any cross-sectional shape, such as circular or polygonal. Preferably, the extruded composite wax article is formed with a generally square cross-sectional shape having a cross-sectional area of about 15 to about 150 $cm^2$, preferably about 30 $cm^2$. The extruded composite article normally contains about 250 to about 30,000 wax rods, such as about 1,000 to about 11,000 wax rods, preferably 4,000 to 4,500 wax rods. In a preferred embodiment, the extruded composite wax article contains about 4,050 wax rods.

The extruded composite wax rod is cut into thin sections to form a veneer having the same decorative pattern throughout including on front and rear faces thereof and at any cross-section taken generally perpendicularly therebetween. The decorative wax veneer has a cross-sectional shape similar to that of the extruded composite wax article and a thickness of about 15 to about 40 millimeters.

The decorative wax veneer can be employed in the manufacture of various types of decorative articles, such as glass bowls and bottles, having any desirable shape, such as generally circular, polygonal and cylindrical. In a preferred embodiment, the decorative wax veneer is employed in the manufacture of a candle, such as what is commonly known as a glowing candle, wherein the decorative wax veneer is applied to a clear wax core and a wick inserted into the wax core. Generally, the softening temperature of the clear wax core is less than the softening temperature of the decorative wax veneer, preferably, sufficiently less so that upon consumption of the wick, the decorative veneer remains intact as a unit and can be retained for decorative purposes or reused.

In another aspect of the invention, a substance is incorporated in the clear wax core or wick which emits an aroma or scent while the candle is glowing. Any conventional scent emitting substance can be employed as, for example, those employed in conventional scented candles. In a preferred embodiment, scent emitting material is introduced by the user into the concave center of the clear wax core about the wick before or after candle lighting, or while the candle is lit. Preferably, a liquid scent emitting material is used which, when exposed to the elevated temperature of molten wax, emits a scent. Thus, the glowing candle can be marketed as a kit with one or more different solid or liquid, preferably liquid, scent emitting materials provided in suitably packaged containers. During illumination, the user can vary the scent by simply decanting the scent-emitting material from the candle core and introducing a different scent emitting material.

The computer generated a digitized image technique of the present invention enables the manufacture of a wax veneer having an intricate decorative pattern which is capable of being reproduced with a high degree of accuracy. The ability to manufacture a wax veneer with a reproducible intricate pattern makes it possible to offer consumers a selection of decorative patterns from a catalog or to offer consumers the option of designing their own decorative pattern. Thus, by employing the computer generated digitized image technique of the present invention, glowing candles bearing corporate logos can be produced with consistently high accuracy on demand.

Another aspect of the present invention resides in modifying or adjusting the decorative pattern during the manufacturing process. This advantageous ability is achieved by generating the digitized image on transparent plastic material, wrapping the plastic material about a source of illumination and viewing the illuminated transparency to preview the glowing decorative pattern, i.e., to ascertain how the decorative pattern will actually look in use when incorporated in a glowing candle. Normally, one to four sheets of plastic material are used to obtain a desired contrast. Upon previewing the illuminated decorative pattern, adjustments can be made to the decorative pattern, as by altering the color or design itself, to obtain a desired glowing visual effect.

In previewing the glowing decorative pattern, the transparent plastic sheets can be placed in proximity to or in abutment with any convenient source of illumination, such as a light bulb. Preferably, the transparent plastic sheets are wrapped about a clear wax core similar to that used in the manufacture of a glowing candle. The clear wax core is then illuminated internally, as by a light or an actual wick, and the transparency viewed to preview the glowing decorative pattern and desired adjustments made to the decorative pattern in response to such previewing.

In manufacturing glowing candles employing the decorative veneers of the present invention, the process employed in producing conventional glowing candles from conventional decorative veneers can be employed. This process basically involves softening a clear wax core and veneer, applying the decorative veneer to the outer surface with the wax core, placing the wax core having the veneer thereon into a mold and elevating the temperature and pressure to improve bonding and for shaping. Any desired shape of glowing candle can be produced, such as circular, hexagonal, square, rectangular or cylindrical. A hole is then drilled in the wax core and a wick inserted. Finishing operations, such as polishing followed by insertion in a clear molten wax bath, are then performed to provide a smooth surface.

EXAMPLE

Figure 9:
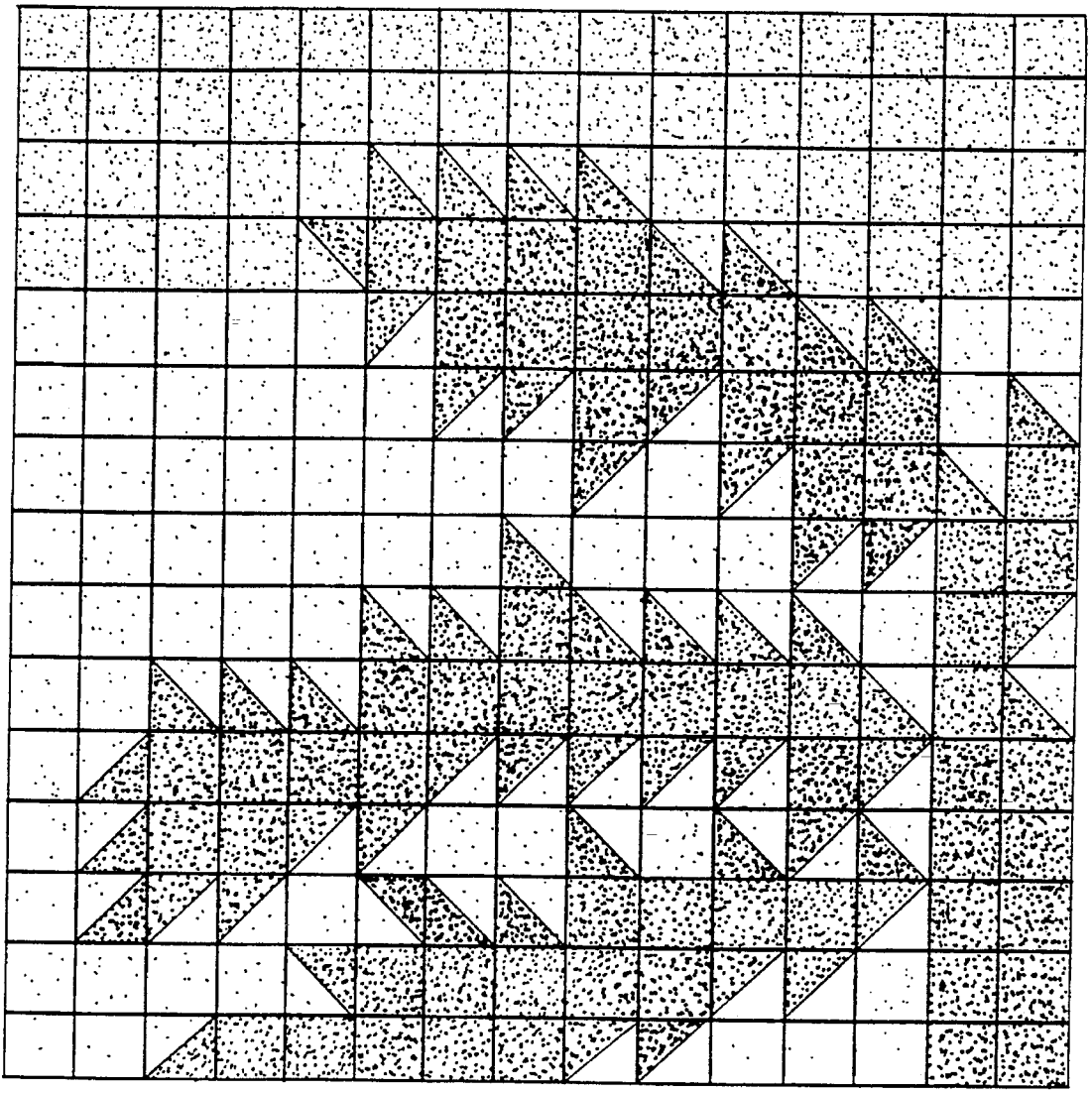
FIG. 9 depicts a computer generated enlargement of the first square section of FIG. 8.
Figure 10A:
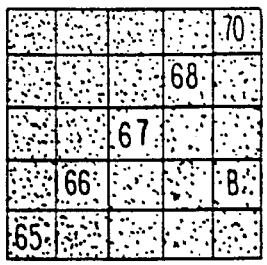
FIG. 10 depicts computer generated sections of the enlargement of FIG. 9.
Figure 10B:
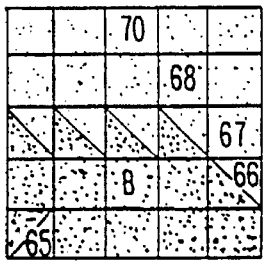
Figure 10C:
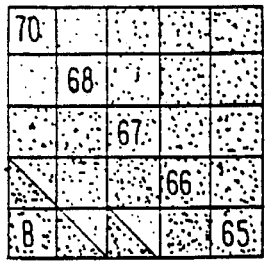
Figure 10D:
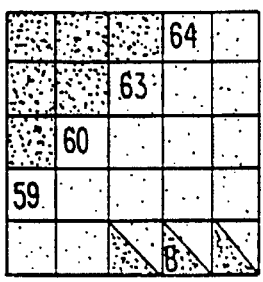
Figure 10E:
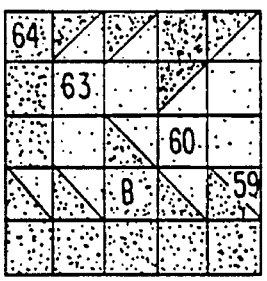
Figure 10F:
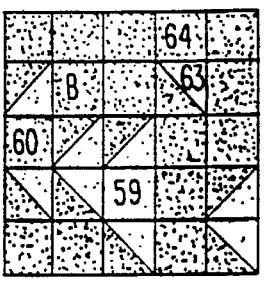
Figure 10G:
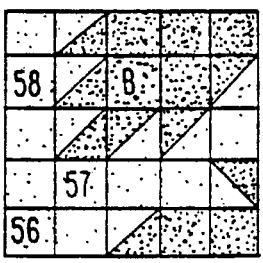
Figure 10H:
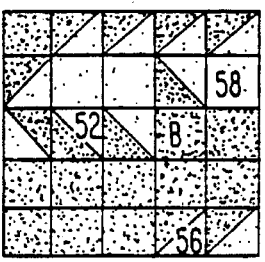
Figure 10I:
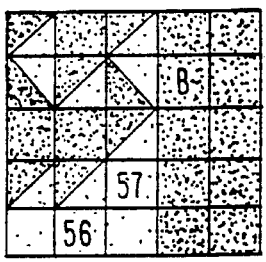

A decorative pattern for a glowing candle was designed and a digitized image of the decorative pattern generated with a computer employing CorelDraw/PhotoShop software. FIGS. 7 through 10 represent computer generated digitized images of the decorative pattern or sections thereof employed in the manufacture of the glowing candle shown in FIG. 11. The decorative pattern of FIG. 7 was divided into nine square sections as shown in FIG. 8. Each of these square sections was then enlarged. FIG. 9 shows an enlargement of the first square section of FIG. 8. Each of the enlarged square sections was then separated into nine square subsections each comprising about 50 colored pixels. Each colored pixel has a generally right triangular cross-sectional shape. Nine subsections of the enlarged sections shown is FIG. 9 are shown in FIG. 10.

Figure 11:
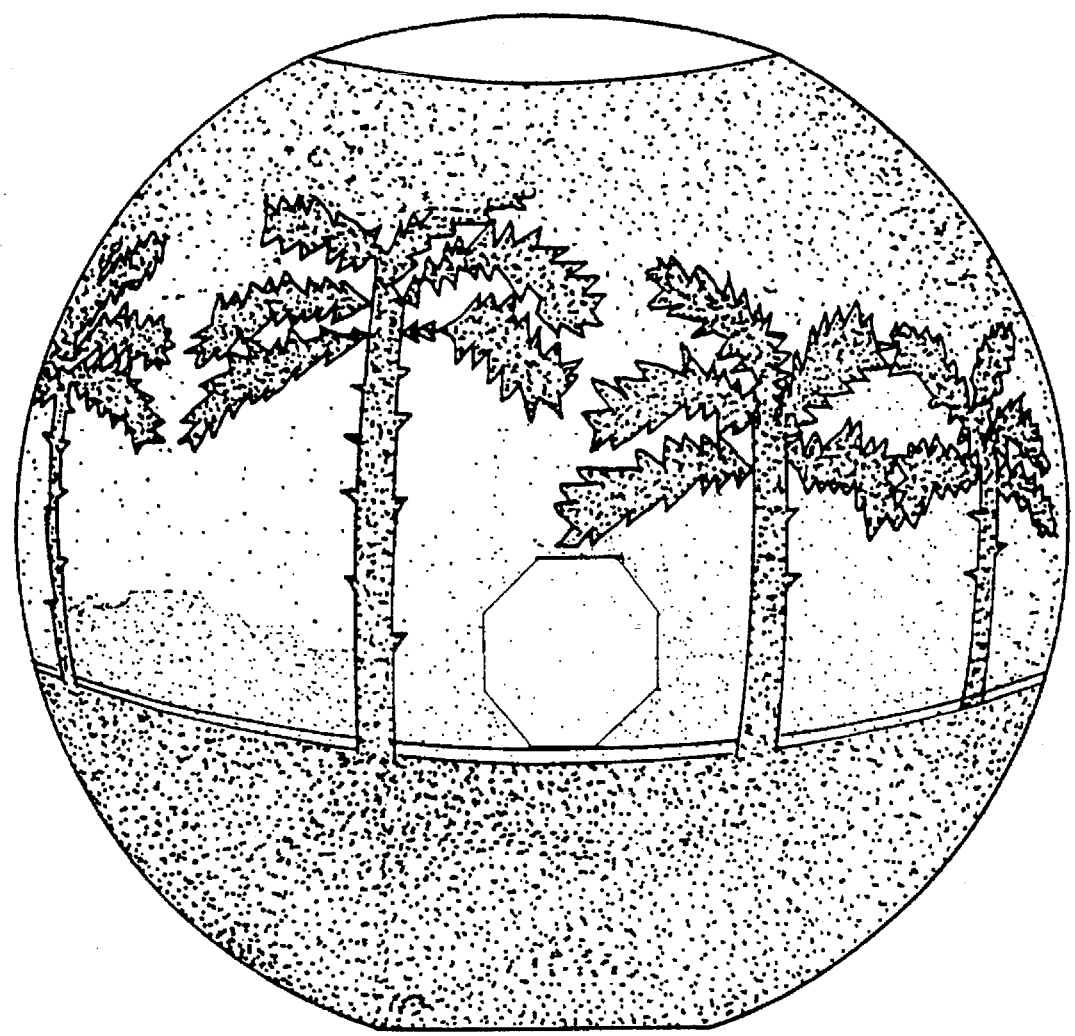
FIG. 11 depicts a glowing candle having the decorative pattern of FIG. 7.

Fifty colored wax rods were then selected in accordance with the colored pixels visually observed in each of the subsections shown in FIG. 10, combined, and extruded to form a first extruded composite wax section corresponding to each of the sections shown in FIG. 10. This process was repeated until all of the first extruded composite wax subsections were obtained to produce the ultimate decorative pattern. Nine first extruded wax subsections were then selected and extruded through a generally square shaped dye head or orifice to produce second extruded composite wax sections corresponding to those shown in FIG. 8. Nine of such second extruded composite wax sections were then assembled and extruded to form an elongated extruded composite wax article containing 4,050 wax rods defining the decorative pattern shown in FIG. 7. Thus, sections were cut from the extruded composite wax article to form a decorative wax veneer. The glowing candle formed with such decorative wax veneer is shown in FIG. 11.

The decorative wax veneer of the present invention enjoys utility in the manufacture of various decorative articles other than glowing candles. For example, the inventive decorative wax veneer can be employed in the manufacture of bowls, bottles, or decanters, using various core materials, such as ceramics, clays, metals, wood and glass.

The present invention is not confined to a wax veneer or to decorative articles having a wax veneer. The present invention embodies the concept of forming a decorative pattern comprising a plurality of distinctly colored extruded rods, wherein the colored rods are selected in accordance with colored pixels of a digitized image of a desired decorative pattern. This concept is applicable to various types of articles formed from an elongated composite article having a longitudinal axis, a front and a rear face, and comprising a plurality of elongated rods, such as rods of a consumable material, each rod extending generally parallel to the longitudinal axis and having a distinct color, wherein the plurality of consumable rods define a decorative pattern throughout the entire elongated composite article including on the front face and rear faces and at any cross-section taken in the direction generally perpendicular to the longitudinal axis. The previously discussed technique for producing an elongated composite wax article and decorative wax veneer are applicable to the production of various decorative articles, such as plastic buttons, or decorative consumable articles employing rods of consumable materials, wherein the ultimate article has a decorative pattern throughout. The expression "consumable" as used herein, encompasses articles or materials which, in their normal use, undergo a decrease in volume. For example, consumable articles encompassed by the present invention include soaps, confections such as a bar of candy, deodorants, and air fresheners. During normal use, such articles continually decrease in volume; however, when produced in accordance with the present invention, the decorative pattern remains visible with high resolution throughout the consumable article until the article is exhausted or expended to the point that is practical utility is substantially gone.

In producing the decorative articles of the present invention, including consumable articles, the technique previously set forth is employed, including selecting the decorative pattern, generating a digitized image, selecting rods having colors in accordance with the colors of pixels of the digitized image, and extruding the rods to form a decorative article. The particular materials, such as consumable materials, for example, soaps, confections, air fresheners, and deodorants, are selected from those conventionally available, as well as the pigments and dispersants. The present invention is not limited with respect to any particular type of material or ingredient. Rather, the present invention focuses upon providing a decorative pattern having a high degree of resolution including intricate designs, with predictability and reproducibility not heretofore attainable, by selecting a plurality of distinctly colored rods for extrusion in accordance with distinctly colored pixels of a digitized image of a desired decorative pattern. Not only is the resolution considerably enhanced, but the present invention enables the production of patterns having features which are more intricate than previously attainable. Such patterns can, therefore, also be provided with a greater number of details than heretofore attainable. In addition, the present invention enables control over a particular area of a decorative pattern so that its proximity to the perimeters or frame of the pattern can be accurately predetermined vis-à-vis conventional practices.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

I claim:

1. An elongated composite article having a longitudinal axis, a front face and a rear face, which elongated article comprises a plurality of elongated wax rods, each wax rod extending generally parallel to the longitudinal axis and having a distinct color, wherein the plurality of wax rods define a decorative pattern throughout the elongated composite article including on the front and rear faces and at any cross-section taken in a direction generally perpendicular to the longitudinal axis, and wherein the elongated article comprises greater than about 30 wax rods per square centimeter of cross-sectional area.

2. The article according to claim 1, comprising between about 31 to about 1,200 wax rods per square centimeter of cross-sectional area.

3. The article according to claim 1, wherein the wax rods have a generally circular, square and/or triangular cross-sectional shape.

4. The article according to claim 3, wherein each wax rod has a generally right triangular cross-sectional shape.

5. The article according to claim 1, wherein each wax rod comprises a wax, a dye and a dispersant.

6. The article according to claim 5, wherein the dye comprises a natural organic dye.

7. The article according to claim 5, wherein the wax comprises a fully refined paraffin wax.

8. The article according to claim 1, having a length of about 30 to about 200 centimeters, and a cross-sectional area of about 15 to about 150 square centimeters.

9. The article according to claim 1, having a cross-sectional area of about 15 to about 150 square centimeters.

10. The article according to claim 9, having a cross-sectional area of about 30 square centimeters.

11. The article according to claim 1, having a generally polygonal cross-sectional shape.

12. The article according to claim 11, having a generally rectangular cross-sectional shape.

13. The article according to claim 11, having a generally square cross-sectional shape.

14. The article according to claim 1, comprising about 250 to about 30,000 wax rods.

15. The article according to claim 14, comprising about 1,000 to about 11,000 wax rods.

16. The article according to claim 15, comprising about 4,000 to about 4,500 wax rods.

17. The article according to claim 16, comprising about 4,050 wax rods.

18. An elongated composite article having a longitudinal axis, a front face and a rear face, which elongated composite article comprises a plurality of elongated composite sections each having a generally square cross-sectional shape and each containing a plurality of elongated wax rods, each wax rod extending in a direction generally parallel to the longitudinal axis and having a distinct color, wherein the plurality of wax rods define a decorative pattern throughout the elongated composite article including on the front and rear faces and at any cross-section taken in a direction generally perpendicular to the longitudinal axis.

19. The article according to claim 18, comprising about 30 to about 1,200 wax rods per square centimeters of cross-sectional area.

20. The article according to claim 18, wherein the wax rods have a generally circular, square and/or triangular cross-sectional shape.

21. The article according to claim 18, wherein each wax rod has a generally right triangular cross-sectional shape.

22. The article according to claim 18, wherein each wax rod comprises a wax, a dye and a dispersant.

23. The article according to claim 22, wherein the dye comprises a natural organic dye.

24. The article according to claim 23, wherein the wax comprises a fully refined paraffin wax.

25. The article according to claim 18, having a length of about 30 to about 200 centimeters, and a cross-sectional area ranging from about 15 to about 150 square centimeters.

26. The article according to claim 18, having a cross-sectional area of about 15 to about 150 square centimeters.

27. The article according to claim 26, having a cross-sectional area of about 30 square centimeters.

28. The article according to claim 18, having a generally polygonal cross-sectional shape.

29. The article according to claim 28, having a generally rectangular cross-sectional shape.

30. The article according to claim 28, having a generally square cross-sectional shape.

31. The article according to claim 18, comprising about 250 to about 30,000 wax rods.

32. The article according to claim 31, comprising about 1,000 to about 11,000 wax rods.

33. The article according to claim 32, comprising about 4,000 to about 4,500 wax rods.

34. The article according to claim 33, comprising about 4,050 wax rods.

35. A decorative veneer comprising a front face and a rear face formed by a plurality of wax rods extending between the front and rear faces, each wax rod having a distinct color, wherein the plurality of wax rods define a decorative pattern throughout the decorative veneer including on the front and rear faces and at any cross-section taken between the front and rear faces, and wherein the decorative veneer comprises greater than about 30 wax rods per square centimeter of cross-sectional area.

36. The decorative veneer according to claim 35, comprising between about 30 to about 1,200 wax rods per square centimeter of cross-sectional area.

37. The decorative veneer according to claim 35, wherein the wax rods have a generally circular, square and/or triangular cross-sectional shape.

38. The decorative veneer according to claim 37, wherein each wax rod has a generally right triangular cross-sectional shape.

39. The decorative veneer according to claim 35, wherein each wax rod comprises a wax, a dye and a dispersant.

40. The decorative veneer according to claim 39, wherein the dye comprises a natural organic dye.

41. The decorative veneer according to claim 39, wherein the wax comprises a fully refined paraffin wax.

42. The decorative veneer according to claim 35, having a cross-sectional area of about 15 to about 150 square centimeters.

43. The decorative veneer according to claim 42, having a cross-sectional area of about 30 square centimeters.

44. The decorative veneer according to claim 35, having a thickness of about 0.15 to about 0.4 centimeters, and a cross-sectional area of about 15 to about 150 square centimeters.

45. The decorative veneer according to claim 35, having a generally polygonal cross-sectional shape.

46. The decorative veneer according to claim 45, having a generally rectangular cross-sectional shape.

47. The decorative veneer according to claim 45, having a generally square cross-sectional shape.

48. A decorative veneer produced by cutting a section off the elongated composite article of claim 1.

49. The decorative veneer according to claim 48, having a thickness of 15 to about 40 millimeters.

50. A decorative veneer having a front face and a rear face formed by a plurality of composite sections extending between the front and rear faces, each composite section having a cross-sectional shape generally in the form of a square and containing a plurality of wax rods each having a distinct color, wherein the plurality of wax rods define a decorative pattern throughout the decorative veneer including on the front and rear faces and at any cross-section taken between the front and rear faces.

51. The decorative veneer according to claim 50, comprising about 30 to about 1,200 wax rods per square centimeter of cross-sectional area.

52. The decorative veneer according to claim 50, wherein the wax rods have a generally circular, square and/or triangular cross-sectional shape.

53. The decorative veneer according to claim 52, wherein each wax rod has a generally right triangular cross-sectional shape.

54. The decorative veneer according to claim 50, wherein each wax rod comprises a wax, a dye and a dispersant.

55. The decorative veneer according to claim 54, wherein the dye comprises a natural organic dye.

56. The decorative veneer according to claim 50, wherein the wax comprises a fully refined paraffin wax.

57. The decorative veneer according to claim 50, having a cross-sectional area of about 15 to about 150 square centimeters.

58. The decorative veneer according to claim 57, having a cross-sectional area of about 30 square centimeters.

59. The decorative veneer according to claim 50, having a thickness of about 15 to about 40 millimeters and a cross-sectional area of about 15 to about 150 square centimeters.

60. The decorative veneer according to claim 50, having a generally polygonal cross-sectional shape.

61. The decorative veneer according to claim 60, having a generally rectangular cross-sectional shape.

62. The decorative veneer according to claim 60, having a generally square cross-sectional shape.

63. The decorative veneer according to claim 50, comprising about 250 to about 30,000 wax rods.

64. The decorative veneer according to claim 63, comprising about 1,000 to about 11,000 wax rods.

65. The decorative veneer according to claim 64, comprising about 4,000 to about 4,500 wax rods.

66. The decorative veneer according to claim 65, comprising about 4,050 wax rods.

67. A decorative veneer produced by cutting a section off the elongated article of claim 18.

68. The decorative veneer according to claim 67, having a thickness of about 15 to about 40 millimeters.

69. A decorative article comprising a decorative veneer according to claim 35.

70. A decorative article comprising a decorative veneer according to claim 48.

71. A decorative article, comprising a decorative veneer according to claim 50.

72. A decorative article, comprising a decorative veneer according to claim 67.

73. The decorative article according to claim 69, in the form of a candle.

74. The candle according to claim 73, further comprising a clear wax core containing a wick.

75. The candle according to claim 74, wherein the softening temperature of the clear wax core is less than the softening temperature of the decorative veneer.

76. The candle according to claim 75, wherein the softening temperature of the clear wax core is sufficiently less than the softening temperature of the decorative veneer so that, upon complete burning of the clear wax core, the decorative veneer remains substantially intact.

77. The article according to claim 73, having a generally circular shape.

78. The article according to claim 73, having a generally polygonal shape.

79. The article according to claim 78, having a generally octagonal shape.

80. The article according to claim 78, having a generally square shape.

81. The article according to claim 78, having a generally hexagonal shape.

82. The article according to claim 73, having a generally cylindrical shape.

83. The decorative article according to claim 69 in the form of a bowl.

84. The decorative bowl according to claim 83, comprising a core of a material selected from the group consisting of ceramics, clays, glass, plastic, metal and wood and wax.

85. The decorative article according to claim 69, in the form of a bottle.

86. The bottle according to claim 85, comprising a core of a material selected from the group consisting of ceramics, clays, glass, plastic, metal, wood and wax.

87. The candle according to claim 74, wherein the wax core contains a material which emits a scent when the wax core is heated to its softening temperature.

88. The candle according to claim 74, wherein the wick contains a material which emits a scent upon burning.

89. The candle according to claim 74, further comprising a scent-emitting material placed on the wax core proximate the wick.

90. A kit comprising one or more candles according to claim 74, and one or more containers of a material which emits a scent when the temperature of the wax core is greater than its softening temperature.

91. The kit according to claim 90, wherein the scent-emitting material is a liquid.

92. An elongated composite article having a longitudinal axis, a front face and a rear face, which elongated article comprises a plurality of elongated rods, each rod extending generally parallel to the longitudinal axis and having a distinct color, wherein the plurality of rods define a decorative pattern throughout the elongated composite article including on the front and rear faces and at any cross-section taken in a direction generally perpendicular to the longitudinal axis, and wherein the elongated article comprises greater than about 30 rods per square centimeter of cross-sectional area.

93. The article according to claim 92, comprising between about 31 to about 1,200 wax rods per square centimeter of cross-sectional area.

94. The article according to claim 92, wherein the rods have a generally circular, square and/or triangular cross-sectional shape.

95. A bar of soap comprising at least a section cut from the composite article according to claim 97, wherein each rod comprises a soap, a dye and a dispersant.

96. An elongated composite article having a longitudinal axis, a front face and a rear face, which elongated composite article comprises a plurality of elongated composite sections each having a generally square cross-sectional shape and each containing a plurality of elongated rods, each rod extending in a direction generally parallel to the longitudinal axis and having a distinct color, wherein the plurality of rods define a decorative pattern throughout the elongated composite article including on the front and rear faces and at any cross-section taken in a direction generally perpendicular to the longitudinal axis.

97. The article according to claim 96, comprising about 30 to about 1,200 rods per square centimeters of cross-sectional area.

98. The article according to claim 96, wherein the rods have a generally circular, square and/or triangular cross-sectional shape.

99. A bar of soap comprising at least a section cut from the composite article according to claim 96, wherein each rod comprises a soap, a dye and a dispersant.

100. A confection comprising at least a section cut from the composite article according to claim 92, wherein each rod comprises a confection, a dye and a dispersant.

101. A confection comprising at least a section cut from the composite article according to claim 96, wherein each rod comprises a confection, a dye and a dispersant.

102. A deodorant bar comprising at least a section cut from the composite article according to claim 92, wherein each rod comprises a deodorant, a dye and a dispersant.

103. A deodorant bar comprising at least a section cut from the composite article according to claim 96, wherein each rod comprises a deodorant, a dye and a dispersant.

104. An air freshener comprising at least a section cut from the composite article according to claim 92, wherein each rod comprises an air freshener, a dye and a dispersant.

105. An air freshener comprising at least a section cut from the composite article according to claim 96, wherein each rod comprises an air freshener, a dye and a dispersant.

106. A consumable article comprising at least a section cut from the composite article according to claim 92, wherein each rod comprises a consumable material, a dye and a dispersant.

107. A consumable article comprising at least a section cut from the composite article according to claim 96, wherein each rod comprises a consumable material, a dye and a dispersant.

108. The article according to claim 92, comprising a plurality of plastic rods.

109. The article according to claim 96, comprising a plurality of plastic rods.

110. A button comprising a section cut from the article of claim 108.

111. A button comprising a section cut from the article of claim 109.

* * * * *